United States Patent [19]

Schneider

[11] Patent Number: 5,699,432
[45] Date of Patent: Dec. 16, 1997

[54] CIRCUIT FOR MOBILE RADIO RECEIVERS

[75] Inventor: Steffen Schneider, Munich, Germany

[73] Assignee: Bayerische Motoren Werke Aktiengesellschaft, Munich, Germany

[21] Appl. No.: 752,261

[22] Filed: Nov. 18, 1996

[30] Foreign Application Priority Data

Nov. 16, 1995 [DE] Germany ............... 195 42 738.6

[51] Int. Cl.$^6$ ................................................. H04H 5/00
[52] U.S. Cl. ......................................... 381/11; 381/13
[58] Field of Search ............................ 381/10, 11, 13

[56] References Cited

U.S. PATENT DOCUMENTS

| | | | |
|---|---|---|---|
| 3,673,342 | 6/1972 | Muller | 381/10 |
| 4,221,928 | 9/1980 | Franssen et al. | 381/11 |
| 4,491,957 | 1/1985 | Kamalski . | |
| 4,574,389 | 3/1986 | Schotz . | |
| 4,703,501 | 10/1987 | Sugai et al. | 381/11 |
| 5,455,866 | 10/1995 | Ohashi . | |

FOREIGN PATENT DOCUMENTS

| | | |
|---|---|---|
| 220 469 | 3/1985 | Germany . |
| 35 21 099 | 12/1986 | Germany . |
| 41 11 709 | 1/1992 | Germany . |
| 43 24 304 | 1/1995 | Germany . |

*Primary Examiner*—Forester W. Isen
*Attorney, Agent, or Firm*—Evenson, McKeown, Edwards & Lenahan, P.L.L.C.

[57] ABSTRACT

In a circuit for mobile radio receivers with a device for setting the stereo reproduction portion relative to the mono reproduction portion as a function of changes in the reception field strength, the setting time for the transition from stereo to mono reproduction and vice-versa depends on the reproduction volume and/or dynamic response of the radio signal.

14 Claims, 2 Drawing Sheets

CIRCUIT FOR MOBILE RADIO RECEIVERS

BACKGROUND AND SUMMARY OF THE INVENTION

The invention relates to a circuit and, more particularly, to a circuit for mobile radio receivers with a device for setting the stereo reproduction portion relative to the mono reproduction portion as a function of changes in the reception field strength.

In a circuit for mobile radio receivers, it is known to switch from stereo to mono reproduction without a reaction time when the receiving field strength drops, and to switch back to stereo mode when the receiving field strength increases. The transition back and forth usually takes place continuously.

Mono as opposed to stereo reproduction, as a rule, results in an adverse effect on reproduction comfort. Frequent switching between mono and stereo causes a constant fluctuation of the stereo effect that has a definite effect on reproduction quality. On the other hand, when the field strength drops it is necessary to switch immediately from stereo to mono in order to avoid the signal becoming noisy.

The goal of the invention is to provide a circuit of the above-mentioned type in which the influence of field strength fluctuations on reproduction quality is clearly reduced by contrast with the known circuit.

The invention achieves this goal by providing a circuit for mobile radio receivers with a device for setting the stereo reproduction portion relative to the mono reproduction portion as a function of changes in the reception field strength. The setting time for the transition from stereo to mono reproduction and back again depends on the reproduction volume and/or dynamic response of the radio signal.

The volume and/or dynamic response of the LF signal are important. Volume is the degree of modulation and dynamic response is the ratio of the loudest to the softest point in the signal transmitted by the transmitter. Volume and dynamic response are independent of the setting of the reproduction volume control. At a high volume and/or low dynamic response of the LF signal, the setting time (stereo-mono) and resetting time (mono-stereo) are lengthened (to 4 seconds for example). The noise components in the signal that appear with rapid drops in the field strength are not, or almost are not, detected by high volume or low dynamic response.

At low volume and/or high dynamic response, the device switches rapidly between stereo and mono as before.

At low volume and/or high dynamic response, the switch from mono to stereo and back again is rapid, and at high volume and/or low dynamic response it is slow, 4 seconds long for example. It is possible to select one of only two adjusting times as a function of volume and/or dynamic response. On the other hand, it is advantageous for improvement of reproduction quality to make the adjusting time variable as a function of volume and/or dynamic response. At a low volume and/or high dynamic response, the adjusting time is minimal. At medium volume and/or medium dynamic response, the setting time is 500 ms for example and at high volume and/or low dynamic response it is 4 seconds for example.

Other objects, advantages and novel features of the present invention will become apparent from the following detailed description of the invention when considered in conjunction with the accompanying drawings.

DETAILED DESCRIPTION OF THE DRAWINGS

Figure 1:
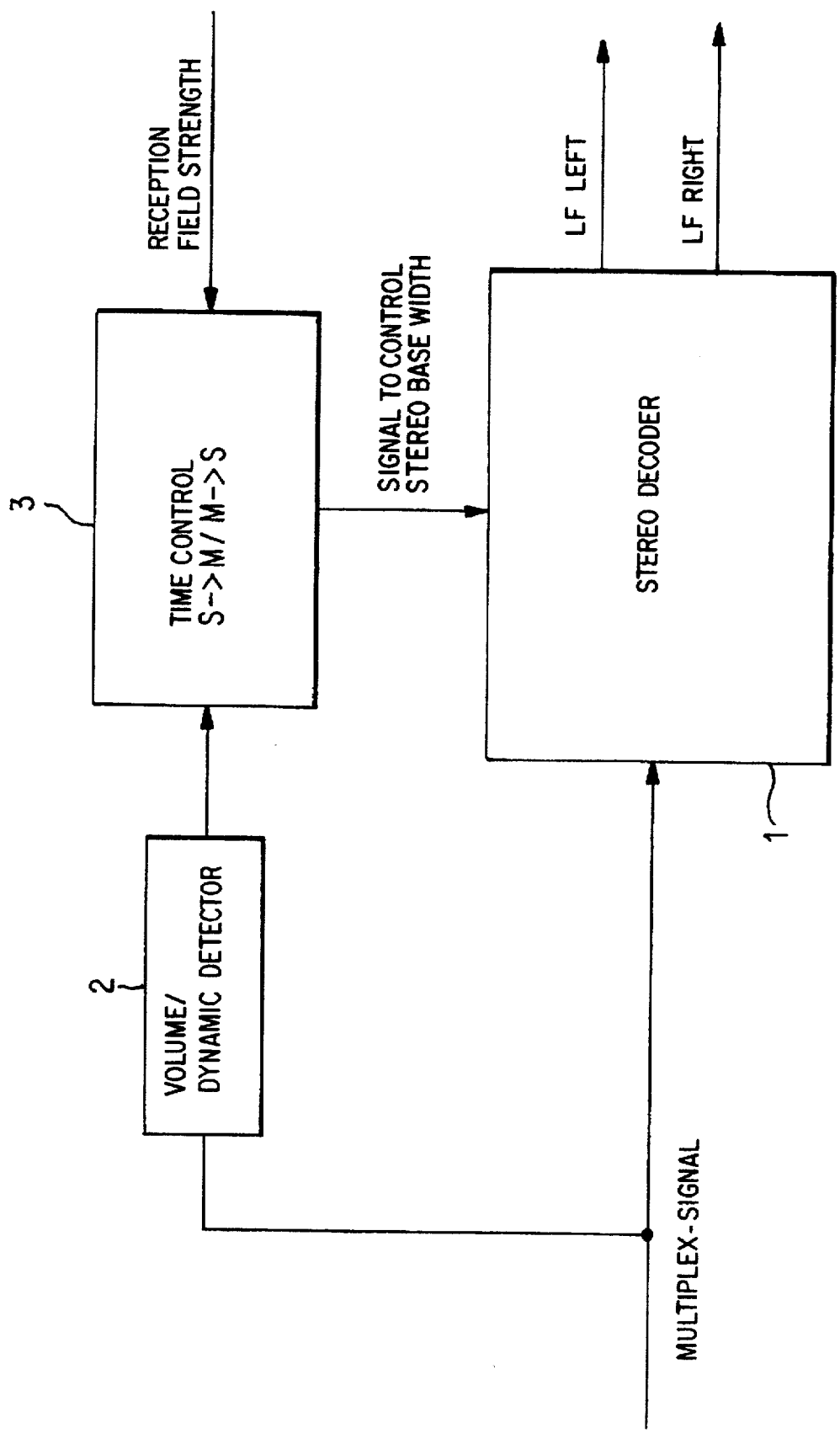
FIG. 1 is a schematic block diagram of a mobile radio receiver according to the present invention.

FIG. 1 shows schematically a part of a mobile radio receiver for use in an automobile for example. The multiplex received signal enters a stereo decoder 1 and is output there as an LF signal to the left and right reproduction channels. The received signal is also fed through a volume and/or dynamic detector 2, which provides an output signal to a circuit 3.

Detector 2 is followed by the circuit 3, which additionally receives and processes a rapid reception field strength signal as a function of the control parameter from the detector circuit 2. The circuit 3 outputs a signal to control the stereo base width to the stereo decoder 1. The signal for controlling the stereo base width follows the reception field strength more or less rapidly, depending on the output signal from circuit 2.

Figure 2:
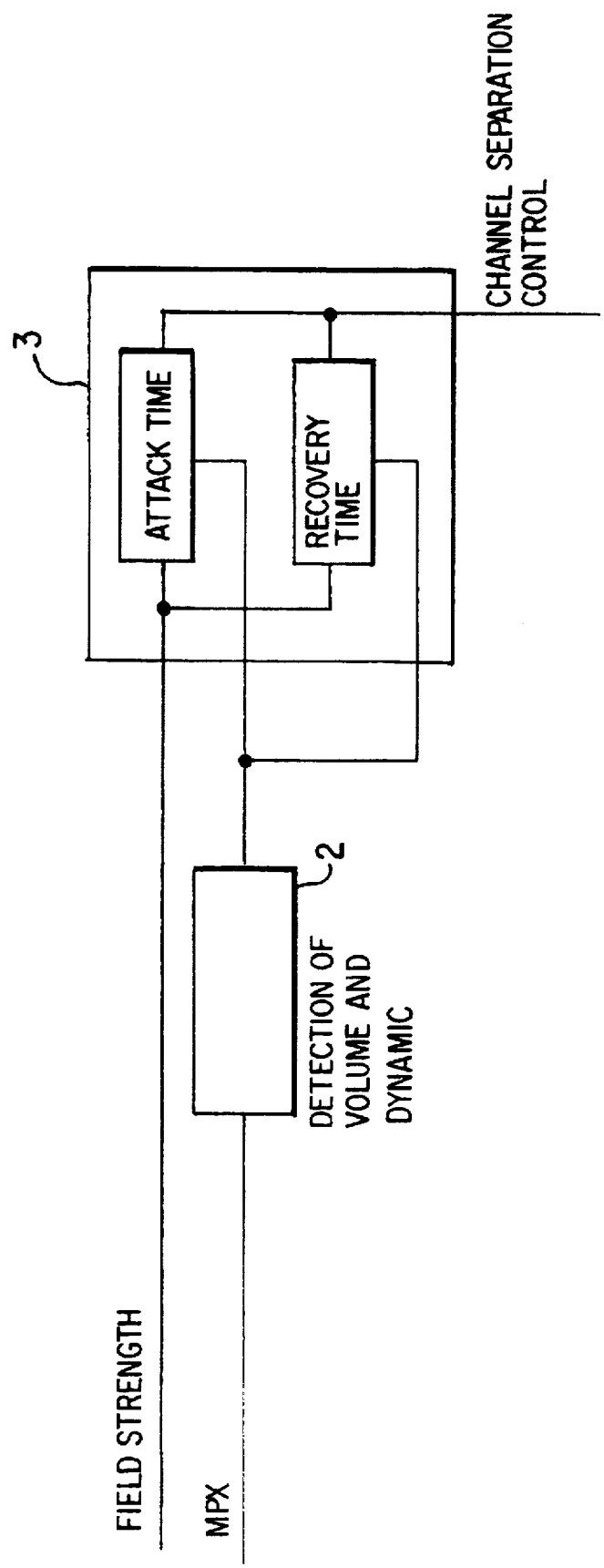
FIG. 2 is a schematic block diagram of a time control circuit illustrated in FIG. 1 according to the present invention.

FIG. 2 schematically shows the time control circuit 3 which receives the reception field strength input signal and the output signal from the volume/dynamic detector. The time control circuit 3 includes an attack timer circuit for changing from stereo to mono (S→M) and a recovery timer circuit for changing back again from mono to stereo (M→S). Both the attack timer and recovery timer receive inputs from the reception field strength signal and the detector 2. Time control circuit 3 thus outputs the channel separation control signal to the stereo decoder 1.

Control is performed such that at low volume and/or high dynamic response, the signal for controlling the stereo channel separation with almost no delay corresponds to the reception field strength signal. There is an immediate and complete switch from stereo to mono and back to stereo when the field strength increases. At high volume and/or low dynamic response, an average is formed over the field strength. Severe fluctuations are averaged. There is a slow change from stereo to mono and back again. Channel separation follows the average value and is slowed down in comparison with the case described above. The signal for controlling the stereo channel separation constitutes nearly the average of the reception field strength signal over 4 seconds for example. Continuous switching between mono and stereo is therefore avoided.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A mobile radio receiver circuit, comprising:
   a setting circuit for setting a stereo reproduction portion of a received multiplex-signal relative to a mono reproduction portion as a function of changes in a reception field strength signal, wherein a setting time for a transition from said stereo reproduction to said mono reproduction and back again depends on at least one of a reproduction volume and dynamic response of said multiplex-signal.

2. The circuit according to claim 1, wherein said setting time is minimal at at least one of a low volume and a high dynamic response.

3. The circuit according to claim 1, wherein said setting time is maximum at at least one of a high volume and a low dynamic response.

4. The circuit according to claim 2, wherein said setting time is maximum at at least one of a high volume and a low dynamic response.

5. The circuit according to claim 2, wherein a resetting time is variable as a function of at least one of the reproduction volume and the dynamic response of the multiplex-signal.

6. The circuit according to claim 3, wherein a resetting time is variable as a function of at least one of the reproduction volume and the dynamic response of the multiplex-signal.

7. The circuit according to claim 4, wherein a resetting time is variable as a function of at least one of the reproduction volume and the dynamic response of the multiplex-signal.

8. A mobile radio receiver circuit, comprising:

a stereo decoder which receives a multiplex-signal and outputs an LF signal to a left and a right reproduction channel;

a detector circuit which receives said multiplex-signal, said detector circuit detecting at least one of a volume and dynamic response of said multiplex-signal and providing a detected output signal;

a processing circuit which receives said detected output signal and a reception field strength signal and provides a control signal output for controlling a stereo base width, said control signal output being input to said stereo decoder; and wherein said processing circuit determines a switching time from a stereo reproduction mode to a mono reproduction mode and back again depending on at least one of a reproduction volume and dynamic response of said multiplex-signal.

9. The mobile radio receiver circuit according to claim 8, wherein said switching time is minimal at at least one of a low volume and a high dynamic response.

10. The mobile radio receiver circuit according to claim 9, wherein said switching time is maximum at at least one of a high volume and a low dynamic response.

11. The mobile radio receiver circuit according to claim 10, wherein said maximum switching time is approximately 4 seconds.

12. The mobile radio receiver circuit according to claim 8, wherein said switching time for at least one of a medium volume and a medium dynamic response is approximately 500 ms.

13. The mobile radio receiver circuit according to claim 8, wherein said switching time is variable as a function of the volume and the dynamic response.

14. A method for setting a stereo reproduction mode relative to a mono reproduction mode for a mobile radio receiver circuit receiving a radio multiplex-signal, the method comprising the steps of:

detecting at least one of a volume and a dynamic response of said radio multiplex-signal and providing a detected output signal;

processing said detected output signal together with a radio field strength reception signal to provide a stereo base width control signal for switching between a stereo reproduction mode and a mono reproduction mode and vice versa as a function of changes in the reception field strength signal; and determining a switching time for said transition from said stereo reproduction mode to said mono reproduction mode and back again depending on at least one of a reproduction volume and a dynamic response of said radio multiplex-signal.

* * * * *